United States Patent
Okawa

(10) Patent No.: US 8,090,960 B2
(45) Date of Patent: Jan. 3, 2012

(54) INFORMATION MANAGING METHOD, INFORMATION MANAGING SYSTEM, SERVER APPARATUS, AND RECORDING MEDIUM

(75) Inventor: Takeshi Okawa, Saitama (JP)

(73) Assignee: Ricoh Company, Ltd., Tokyo (JP)

( * ) Notice: Subject to any disclaimer, the term of this patent is extended or adjusted under 35 U.S.C. 154(b) by 1121 days.

(21) Appl. No.: 11/493,849

(22) Filed: Jul. 27, 2006

(65) Prior Publication Data

US 2007/0033418 A1 Feb. 8, 2007

(30) Foreign Application Priority Data

Aug. 2, 2005 (JP) .................................. 2005-224224

(51) Int. Cl.
*G06F 17/30* (2006.01)

(52) U.S. Cl. ............ 713/192; 726/30; 726/31; 713/193; 713/176

(58) Field of Classification Search .................. None
See application file for complete search history.

(56) References Cited

U.S. PATENT DOCUMENTS

| | | | |
|---|---|---|---|
| 7,231,520 B2* | 6/2007 | Inokuchi et al. | 713/171 |
| 2001/0038694 A1* | 11/2001 | Senshu | 380/201 |
| 2004/0143818 A1* | 7/2004 | Kijima et al. | 717/122 |
| 2006/0277607 A1* | 12/2006 | Chung | 726/27 |
| 2008/0216177 A1* | 9/2008 | Yokosato et al. | 726/26 |
| 2009/0214042 A1* | 8/2009 | Nakahara et al. | 380/278 |

FOREIGN PATENT DOCUMENTS

| | | |
|---|---|---|
| JP | 2005-025389 A | 1/2005 |
| JP | 2006-020253 A | 1/2006 |

* cited by examiner

*Primary Examiner* — Vivek Srivastava
*Assistant Examiner* — Nega Woldemariam
(74) *Attorney, Agent, or Firm* — Morrison & Foerster LLP

(57) ABSTRACT

At a seller, an encryption device encrypts content data stored in a content server using an encryption key generated by an encryption key generation device, and records the encrypted content data and a communication program on a recording medium. A paper indicating an identification code unique to each recording medium is attached to the recording medium. A decryption key corresponding to the encryption key and the identification code are registered in a managing database. A user terminal sends the identification code to a decryption key managing server apparatus via Internet in accordance with the communication program, in a case where the user terminal is to copy or install or reproduce the content data stored on the recording medium. The decryption key managing server apparatus sends a decryption key corresponding to this identification code to the user terminal. The user terminal decrypts the content data using the decryption key sent thereto.

13 Claims, 6 Drawing Sheets

FIG. 3

| PRODUCT ID | LICENSE NUMBER | ENCRYPTION KEY | DECRYPTION KEY | USER INFORMATION | REGISTRATION DATE | CONSENT INFORMATION | NUMBER OF INSTALLATIONS, OUTCOME |
|---|---|---|---|---|---|---|---|
| 1001 | ABC | ***** | ##### | NAME, PHONE NUMBER, etc. | yymmdd | CONSENT | 1, SUCCESS |
| | BCE | ***** | ##### | NAME, PHONE NUMBER, etc. | yymmdd | CONSENT | 0, FAILURE |
| | CED | ***** | ##### | NAME, PHONE NUMBER, etc. | yymmdd | NOT CONSENT | 1, SUCCESS |
| 1002 | XYZ | ***** | ##### | NAME, PHONE NUMBER, etc. | yymmdd | CONSENT | 1, SUCCESS |
| 1003 | YZA | ***** | ##### | NAME, PHONE NUMBER, etc. | yymmdd | CONSENT | 0, FAILURE |

INFORMATION MANAGING METHOD, INFORMATION MANAGING SYSTEM, SERVER APPARATUS, AND RECORDING MEDIUM

BACKGROUND OF THE INVENTION

1. Field of the Invention

The present invention relates to an information managing method, an information managing system, a server apparatus and a recording medium suitable for distributing electronically treatable content data via a recording medium or a network.

2. Description of the Related Art

A system for decrypting data, which is distributed in encryption, by using a decryption key distributed separately has conventionally been proposed, as in Unexamined Japanese Patent Application KOKAI Publication No. 2005-025389. Meanwhile, the applicant has proposed a system for realizing protection on data confidentiality, by recording encrypted data on a recording medium so that the data may be decrypted by a decryption key provided separately, as disclosed in Unexamined Japanese Patent Application KOKAI Publication No. 2006-020253.

Computer programs for performing various processes or content data carrying videos and music in an electronically treatable form are recorded on a recording medium such as, for example, a CD-ROM (Compact Disk Read Only Memory), a DVD-ROM (Digital Versatile Disk Read Only Memory), etc. to be sold or rented. It is also practiced to sell such computer programs and content data via a communication network or rent these via a communication network for a limited rental period or with a limited number of usage chances allowed.

It is often the case that the management of these computer programs and content data is up to the moral of the users who purchased or rented these. Thus, it is the reality that there is no end to some users: committing illegal acts of subletting the programs and data to others without authorization or copying and giving them to others. Software developers and sellers are seriously injured by these illegal acts.

Nevertheless, according to the conventional arts, it is easy to copy, install and reproduce the decrypted data illegally, by storing the decrypted data on other media than the original medium by which the data was distributed. Furthermore, if the decryption key is offered together with the encrypted data, the data can easily be copied, installed and reproduced illegally.

SUMMARY OF THE INVENTION

The present invention was made in view of this problem, and an object of the present invention is to make prohibition against unauthorized copy, installation, and reproduction of electrically treatable data effective, by appropriately managing a decryption key for decrypting encrypted data.

To achieve the above object, an information managing method according to a first aspect of the present invention is an information managing method used for a system for prohibiting electronically treatable content data from being copied and/or installed and/or reproduced without authorization, wherein the content data is encrypted beforehand, and an identification code is assigned to each content data, the method is implemented by a server apparatus storing a decryption key for decrypting the encrypted content data, and an information processing terminal connected to the server apparatus via a communication network for copying and/or installing and/or reproducing the content data, and the method comprises:

an identification code sending step of the information processing terminal sending the identification code to the server apparatus, in a case where the information processing terminal is to copy and/or install and/or reproduce the content data;

an identification code receiving step of the server apparatus receiving the identification code from the information processing terminal;

a decryption key sending step of the server apparatus sending the decryption key that corresponds to the identification code received at the identification code receiving step to the information processing terminal;

a decryption key receiving step of the information processing terminal receiving the decryption key that corresponds to the identification code sent at the identification code sending step from the server apparatus; and a decrypting step of the information processing terminal decrypting the encrypted content data by using the decryption key received at the decryption key receiving step.

To achieve the above object, an information managing system according to another aspect of the present invention is an information managing system for prohibiting electronically treatable content data from being copied and/or installed and/or reproduced without authorization, wherein the content data is encrypted beforehand, and an identification code is assigned to each content data, the system comprises: a server apparatus storing a decryption key for decrypting the encrypted content data; and an information processing terminal connected to the server apparatus via a communication network for copying and/or installing and/or reproducing the content data, the information processing terminal comprises:

an identification code sending unit which sends the identification code to the server apparatus, in a case where the information processing terminal is to copy and/or install and/or reproduce the content data;

a decryption key reception unit which receives the decryption key that corresponds to the identification code sent by the identification code sending unit; and a decryption unit which decrypts the encrypted content data by using the decryption key received by the decryption key reception unit, and the server apparatus comprises:

an identification code reception unit which receives the identification code from the information processing terminal; and a decryption key sending unit which sends the decryption key that corresponds to the identification code received by the identification code reception unit to the information processing terminal.

To achieve the above object, a server apparatus according to another aspect of the present invention is a server apparatus used in a system for prohibiting electronically treatable content data from being copied and/or installed and/or reproduced without authorization, wherein the content data is encrypted beforehand, and an identification code is assigned to each content data, the server apparatus is connected, via a communication network, to an information processing terminal for copying and/or installing and/or reproducing the content data, and comprises:

an identification code reception unit which receives the identification code from the information processing terminal, in a case where the information processing terminal is to copy and/or install and/or reproduce the content data; and a decryption key sending unit which sends a decryption key which corresponds to the identification code received by the identification code reception unit to the information processing terminal.

To achieve the above object, a recording medium according to another aspect of the present invention is a recording medium used for prohibiting electronically treatable content data from being copied and/or installed and/or reproduced without authorization, wherein the content data is encrypted beforehand, and an identification code is assigned to each content data, an information processing terminal for copying and/or installing and/or reproducing the content data and a server apparatus storing a decryption key for decrypting the encrypted content data are connected to each other via a communication network, the recording medium stores the content data and a communication program for accessing the server apparatus, and in a case where the information processing terminal is to copy and/or install and/or reproduce the content data, the communication program sends the identification code to the server apparatus, and further receives the decryption key that corresponds to the identification code.

To achieve the above object, an information managing system according to another aspect of the present invention is an information managing system for prohibiting electronically treatable content data from being copied and/or installed and/or reproduced without authorization;

wherein the content data is encrypted beforehand, and an identification code is assigned to each content data, the system comprises: a server apparatus storing a decryption key for decrypting the encrypted content data; and an information processing terminal connected to the server apparatus via a communication network for copying and/or installing and/or reproducing the content data, the information processing terminal comprises:
  identification code sending means for sending the identification code to the server apparatus, in a case where the information processing terminal is to copy and/or install and/or reproduce the content data;
  decryption key reception means for receiving the decryption key that corresponds to the identification code sent by the identification code sending means; and
  decryption means for decrypting the encrypted content data by using the decryption key received by the decryption key reception means, and
the server apparatus comprises:
  identification code reception means for receiving the identification code from the information processing terminal; and
  decryption key sending means which sends the decryption key that corresponds to the identification code received by the identification code reception means to the information processing terminal.

To achieve the above object, a server apparatus according to another aspect of the present invention is a server apparatus used in a system for prohibiting electronically treatable content data from being copied and/or installed and/or reproduced without authorization, wherein the content data is encrypted beforehand, and an identification code is assigned to each content data, the server apparatus is connected, via a communication network, to an information processing terminal for copying and/or installing and/or reproducing the content data, and comprises:
  identification code reception means for receiving the identification code from the information processing terminal, in a case where the information processing terminal is to copy and/or install and/or reproduce the content data; and
  decryption key sending means for sending a decryption key which corresponds to the identification code received by the identification code reception means to the information processing terminal.

According to the present invention, it is possible to appropriately manage a decryption key for decrypting encrypted data, and prohibit electronically treatable data from being copied, installed, or reproduced without authorization.

BRIEF DESCRIPTION OF THE DRAWINGS

These objects and other objects and advantages of the present invention will become more apparent upon reading of the following detailed description and the accompanying drawings in which:

FIG. 3 is a diagram showing an example of the structure of management information;

DETAILED DESCRIPTION OF THE PREFERRED EMBODIMENT

The present invention will be explained below with reference to the drawings.

Figure 1:
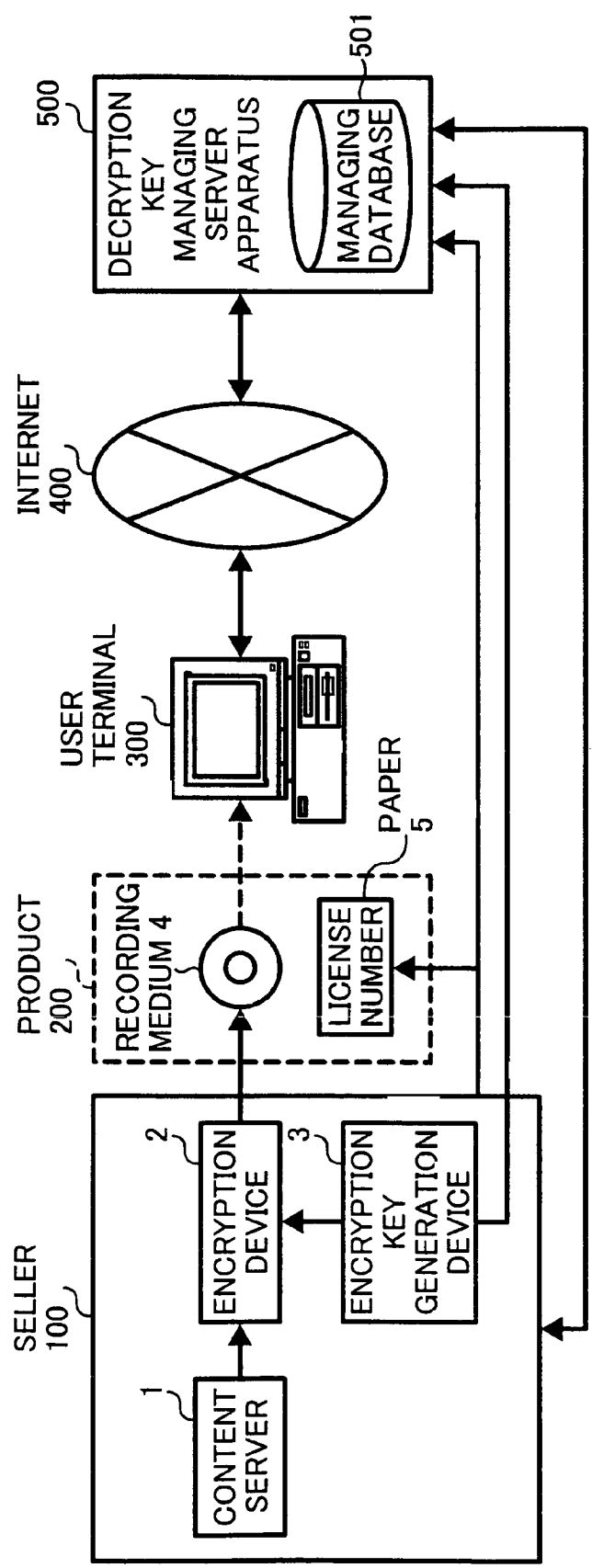
FIG. 1 is a diagram showing the structure of an information managing system according to an embodiment of the present invention.

FIG. 1 is a diagram showing the structure of an information managing system according to an embodiment. A seller 100 which sells software (computer programs and content data such as videos, music, etc.) comprises a content server 1, an encryption device 2, and an encryption key generation device 3. The content server 1 stores computer programs and content data such as videos, music, etc. that are on sale. The encryption device 2 encrypts content data stored in the content server 1 by using an encryption key generated by the encryption key generation device 3. The encryption key generation device 3 also generates a decryption key corresponding to the encryption key. The encrypted content data is recorded on a recording medium 4 such as a CD-ROM, a DVD-ROM, etc. The kinds of the recording medium 4 are not limited to these. A communication program to be described later is also recorded on the recording medium 4. The seller 100 generates a paper 5 indicating an identification code for each recording medium 4. The seller 100 sells a product 200 including the recording medium 4 and the paper 5 in combination to a user.

The seller 100 supplies a decryption key managing server apparatus 500 with the decryption key corresponding to the encryption key generated by the encryption key generation device 3, and a license number indicated on the paper 5. The license number is an identification code assigned to each recording medium 4. The decryption key managing server apparatus 500 stores the supplied license number and decryption key in association in a managing database 501. The decryption key managing server apparatus 500 is connected to Internet 400. Like this, the license number indicated on the paper 5 and the decryption key for the content data stored on the recording medium 4 are stored in the managing database 501 in association with each other.

The user purchases the product 200 which has the recording medium 4 and the paper 5 in one package. The user reads out the data recorded on the recording medium 4 using a predetermined reading device (a CD-ROM drive, a DVD-ROM drive, etc.) of a user terminal 300. The user terminal 300 reads out the predetermined communication program recorded on the recording medium 4 and executes it. For example, the communication program is stored on the recording medium 4 in a manner that it is automatically activated when the recording medium 4 is inserted into the reading device. The user terminal 300 gains connection to the Internet 400, and further gains connection to the decryption key managing server apparatus 500 in accordance with the communication program. The user terminal 300 sends management information such as the product type, etc. recorded on the recording medium 4 to the decryption key managing server apparatus 500. Further, the user terminal 300 receives an input of the license number indicated on the paper 5 and user information from the user, and sends these input data to the decryption key managing server apparatus 500. If the transmitted product type and license number are the proper ones, the decryption key managing server apparatus 500 sends the decryption key corresponding to the license number to the user terminal 300. The user terminal 300 receives the decryption key necessary for decrypting the content data stored on the recording medium 4. Other communication networks may be used instead of the Internet 400.

In this manner, the user terminal 300 can decrypt the content data with the decryption key and use the content data. For example, an application program included in the decrypted content data can be installed on the user terminal 300 and reproduced. A decryption program for decrypting is stored on the recording medium 4.

The decryption key managing server apparatus 500 stores the number of times up to which the decryption key has been sent to the user terminal 300 so far, and the dates on which the decryption key is sent to the user terminal 300, in the managing database 501, license number by license number. This enables the decryption key managing server apparatus 500 to put a limit on the number of times the decryption key can be sent and on the period of use of the decryption key.

The information managing system according to the present embodiment only permits the content data decrypted by the decryption key to be installed on the user terminal 300 or reproduced on the spot. That is, the content data itself is not to be stored in the user terminal 300. The user terminal 300 has to have the decryption key distributed each time the user wants to install and/or reproduce the content data stored on the recording medium 4.

It is very difficult to restore the original information (the content data recorded on the recording medium 4, etc.) from the information installed on the user terminal 300. Further, it is possible to arrange not to allow reproduction signals representing the content data such as videos, music, etc. reproduced by the user terminal 300 to be output to external devices, by prohibiting the user terminal 300 from being equipped with a digital output terminal. This makes unauthorized use of the content data harder. The present system is very effective for sales of computer programs, and rental services of CD-ROMs and DVD-ROMs.

Figure 2:
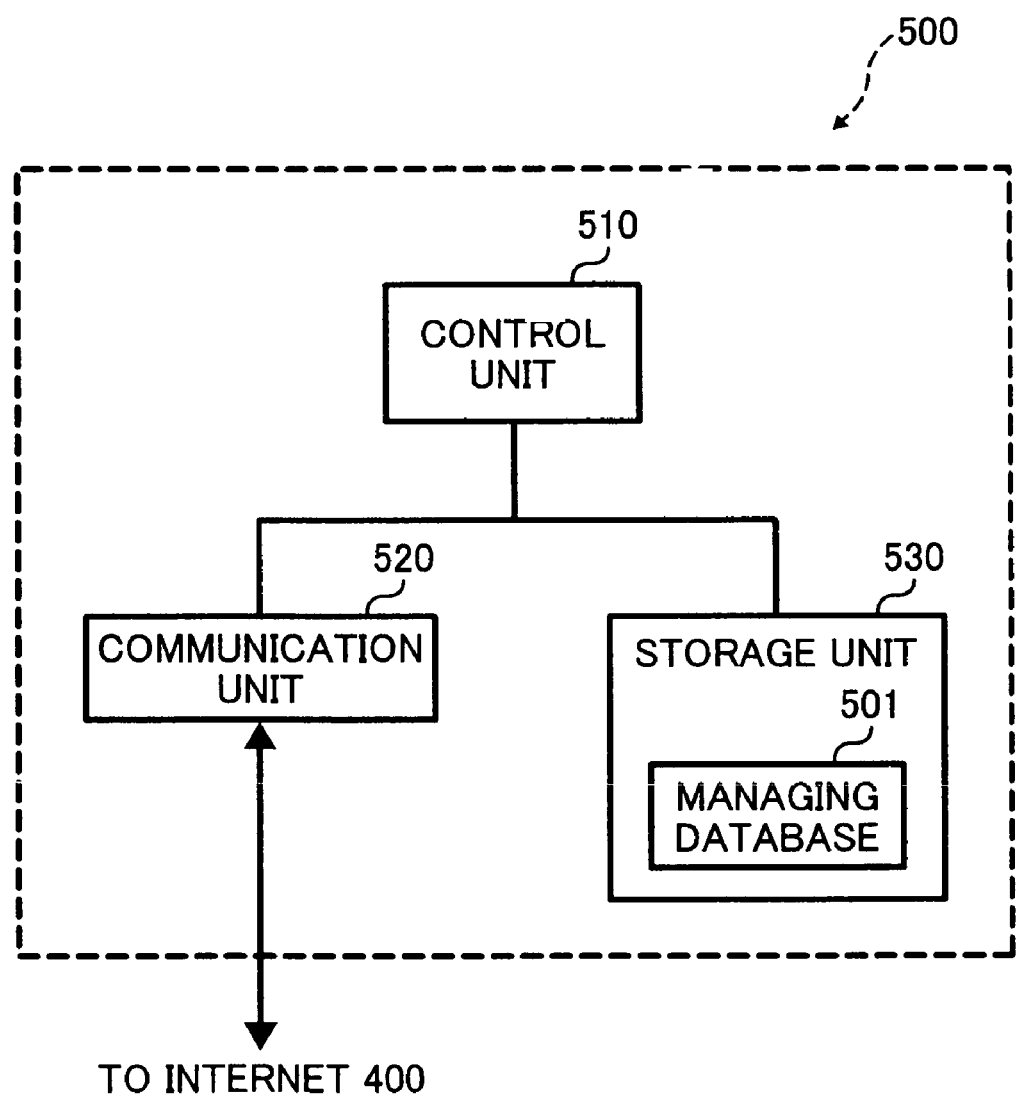
FIG. 2 is a diagram showing the structure of a decryption key managing server apparatus.

Next, a more detailed structure of the decryption key managing server apparatus 500 will be explained with reference to FIG. 2. The decryption key managing server apparatus 500 comprises a control unit 510, a communication unit 520, and a storage unit 530.

The control unit 510 comprises a CPU (Central Processing Unit), and controls each unit of the decryption key managing server apparatus 500 in accordance with an operating system (OS) and control programs, etc. stored in the storage unit 530. For example, the control unit 510 controls the communication unit 520 to send a decryption key, etc. stored in the storage unit 530 to the user terminal 300. The details of the processes performed by the control unit 510 will be described later.

The communication unit 520 comprises predetermined communication devices such as an NIC (Network Interface Card), a router, a modem, etc. The communication unit 520 communicates with the user terminal 300 via the Internet 400 under the control of the control unit 510.

The storage unit 530 comprises storage devices, such as a RAM (Random Access Memory), a ROM (Read Only Memory), a hard disk device, etc. The storage unit 530 stores the OS and programs for controlling the decryption key managing server apparatus 500 as a whole. The storage unit 530 stores the above-described managing database 501.

FIG. 3 is an example of the structure of the data stored in the managing database 501. Product ID indicates the product type of the product 200, and is assigned as a unique number to each product 200. The product ID is represented by numerals, characters, symbols, etc. but representation is not limited to these. License number is an identification code for identifying the recording medium 4, and is indicated on the paper 5. The license number is a unique number within the same produce type, or may be a unique number throughout all the products 200 sold by the seller 100. Encryption key is the key generated by the encryption key generation device 3, that is used when the encryption device 2 encrypts the data to be recorded on the recording medium 4. Decryption key is the key necessary for decrypting the data recorded on the recording medium 4, and is generated by the encryption key generation device 3 in pair with the encryption key. User information is information regarding the user who purchased the product 200, and includes, for example, the name, phone number, address, e-mail address, etc. of the user. The user terminal 300 sends the user information input by the user to the decryption key managing server apparatus 500 via the Internet 400. The decryption key managing server apparatus 500 receives the user information and stores it in the managing database 501. Registration date is the date on which the user information is registered, and may be stored together with time. Further, as will be described later, when the decryption key is sent, the date of sending may be recorded. Consent information is information indicating whether or not the user consents to the convention on the usage of the content data recorded on the recording medium 4. Number of installations and outcome are information indicating the number of times the user has installed the content data recorded on the recording medium 4 on the user terminal 300, and whether or not the installation ends in success. Or, these may be information indicating the number of times the content data has been reproduced, the number of times the content data has been read or reproduced, etc., and whether or not these acts end in success. The structure of the managing database 501 shown in FIG. 3 is one example, and a structure including a part or all of this structure may be employed. Note that the decryption key managing server apparatus 500 can obtain product ID, license number, encryption key, and decryption key from the content server 1 or the encryption key generation device 3 via the Internet 400.

Figure 4:
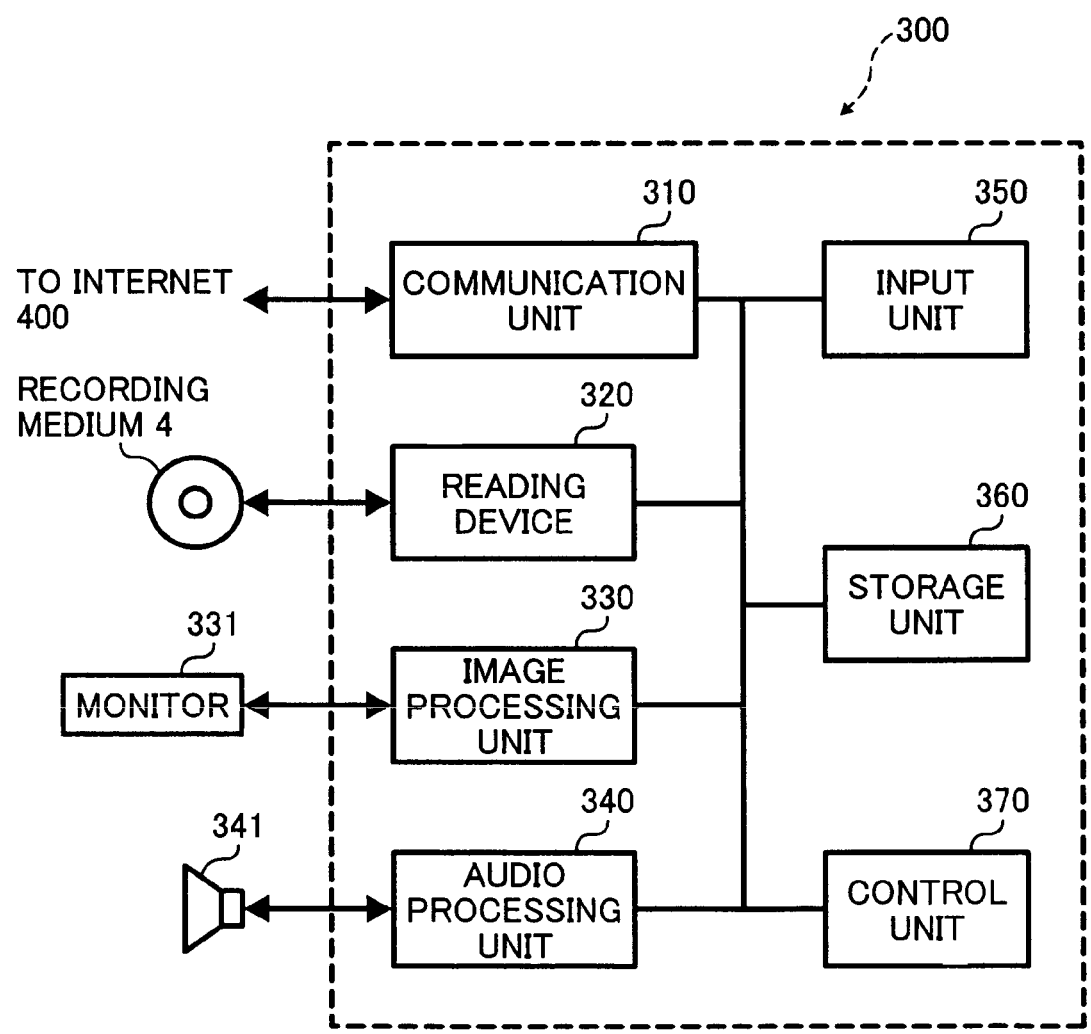
FIG. 4 is a diagram showing the structure of a user terminal.

Next, a more detailed structure of the user terminal 300 will be explained with reference to FIG. 4. The user terminal 300 comprise a communication unit 310, a reading device 320, an image processing unit 330, an audio processing unit 340, an input unit 350, a storage unit 360, and a control unit 370.

The communication unit 310 comprises predetermined communication devices such as an NIC, a modem, etc. and connects the user terminal 300 to the Internet 400. The communication unit 310 exchanges data with the decryption key managing server apparatus 500 via the Internet 400 under the control of the control unit 370.

The reading device 320 comprises a CD-ROM drive, a DVD-ROM drive, or the like, and reads out the content data from the recording medium 4 of the product 200. The reading device 320 may have a function for writing data on another recording medium.

The image processing unit 330 processes video data read out from the recording medium 4 with the aid of the control unit 370 and an image calculation processor (unillustrated) included in the image processing unit 330, and records the processed video data on a frame memory (unillustrated) included in the image processing unit 330. The image information recorded on the frame memory is converted into a video signal at a predetermined synchronization timing, and output to a monitor 331 connected to the image processing unit 330. Thereby, image display of various types becomes available. The image calculation processor can rapidly perform transparent operations such as overlay operation or alpha blending of two-dimensional images, and saturate operations of various types.

The audio processing unit 340 converts audio data read out from the recording medium 4 into an analog signal and outputs it to a speaker 341 connected thereto. In a case where the audio data recorded on the recording medium 4 is MIDI (Musical Instruments Digital Interface) data, the audio processing unit 340 converts the MIDI data into PCM data with reference to sound generation data possessed therein. Further, in a case where the audio data is compressed audio data in ADPCM (Adaptive Differential Pulse Code Modulation) form, Ogg Vorbis form, etc., the audio processing unit 340 expands the data to convert it into PCM data. The PCM data is D/A (Digital/Analog) converted at a timing mating its sampling frequency, and then output to the speaker 341, thereby audio output is available.

The input unit 350 receives an operation signal from an input device (unillustrated) such as a keyboard, a mouse, etc., and outputs a key code signal corresponding to the operation signal to the control unit 370. The control unit 370 determines the content of operation based on the key code signal.

The storage unit 360 comprises storage devices such as a RAM, a ROM, a hard disk device, etc. The storage unit 360 stores an OS and programs for controlling the user terminal 300 as a whole. The storage unit 360 may comprise an external interface for reading data from or writing data on a recording medium such as, a removable disk, a flash memory card, etc. That is, the content data may be read out from the recording medium 4 connected to this external interface.

The control unit 370 comprises a CPU, and reads out the OS and programs stored in the storage unit 360 into a RAM and executes them, thereby controlling the user terminal 300 as a whole. The details of the processes to be performed by the control unit 370 will be described later.

Next, the structure of the content server 1 will be explained. The content server 1 comprises a communication unit, a storage unit, and a control unit. The communication unit comprises an NIC, etc., and connects the content server 1 to the encryption device 2. The storage unit comprises a ROM, a RAM, a hard disk device, etc., and stores various content data. The control unit comprises a CPU, etc., and controls the content server 1 as a whole. The control unit supplies the content data stored in the storage unit to the encryption device 2 by controlling the communication unit.

Next, the structure of the encryption device 2 will be explained. The encryption device 2 comprises a communication unit, a storage unit, and a control unit. The communication unit comprises an NIC, etc., and connects the encryption device 2 to the content server 1 and to the encryption key generation device 3. The storage unit comprises a ROM, a RAM, a hard disk device, etc. The control unit comprises a CPU, etc., and controls the encryption device 2 as a whole. The control unit acquires content data from the content server 1 and an encryption key from the encryption key generation device 3 respectively, and encrypts the content data with the encryption key. The encryption device 2 records the encrypted content data on the recording medium 4. The data may be recorded on the recording medium 4 with the user of another device. The control unit encrypts the content data by using a predetermined encryption algorithm, however, the present invention does not limit the encryption method.

Next, the structure of the encryption key generation device 3 will be explained. The encryption key generation device 3 comprises a communication unit, a storage unit, and a control unit. The communication unit comprises an NIC, etc., and connects the encryption key generation device 3 to the encryption device 2. The storage unit comprises a ROM, a RAM, a hard disk device, etc. The control unit comprises a CPU, etc., and controls the encryption key generation device 3 as a whole. The control unit generates an encryption key for encrypting the content data, and a decryption key to be paired with that encryption key. The control unit supplies the generated encryption key to the encryption device 2, and the generated decryption key to the decryption key managing server apparatus 500.

Figure 5:
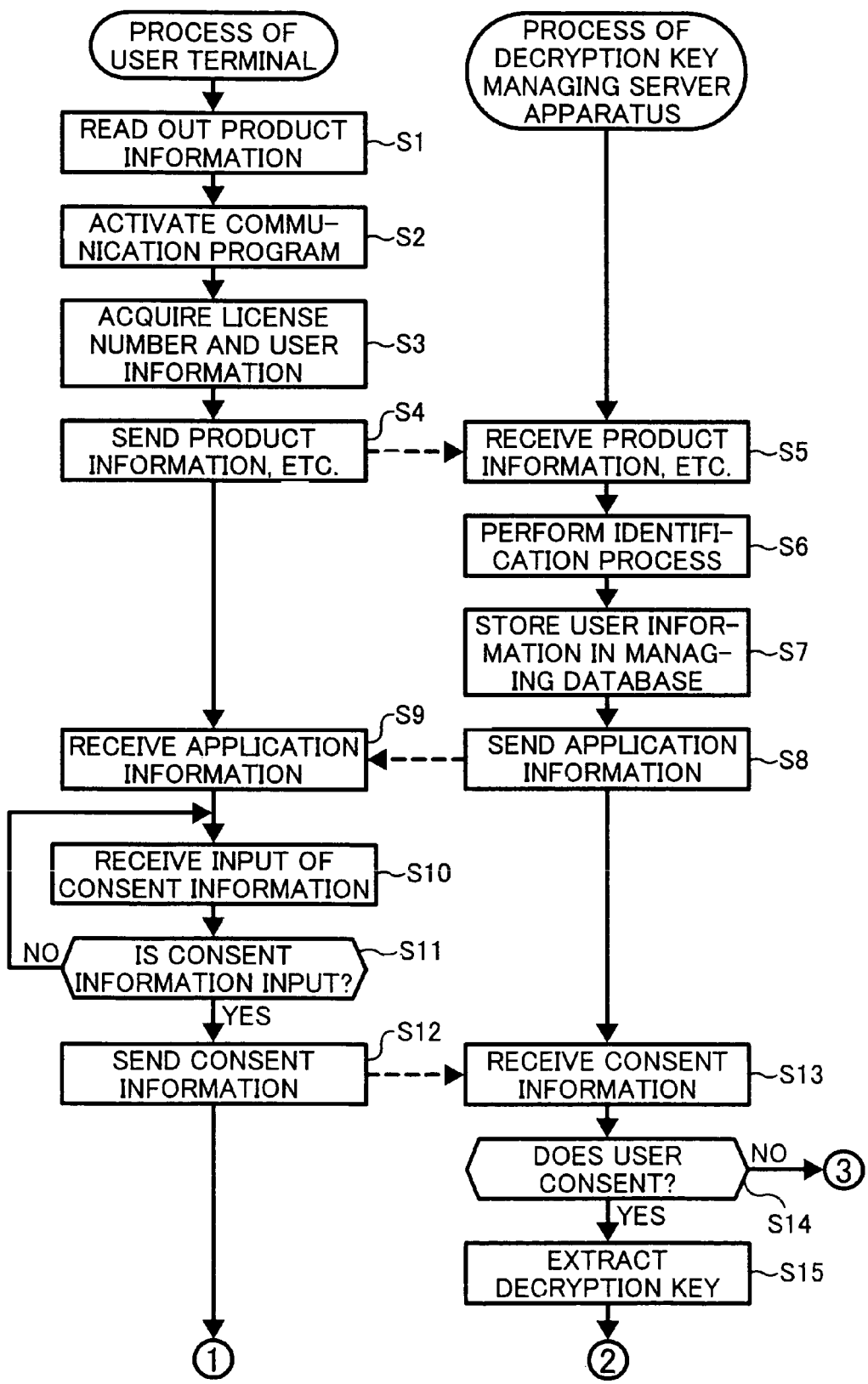
FIG. 5 is a flowchart for explaining the processes performed by the decryption key managing server apparatus and the user terminal.
Figure 6:
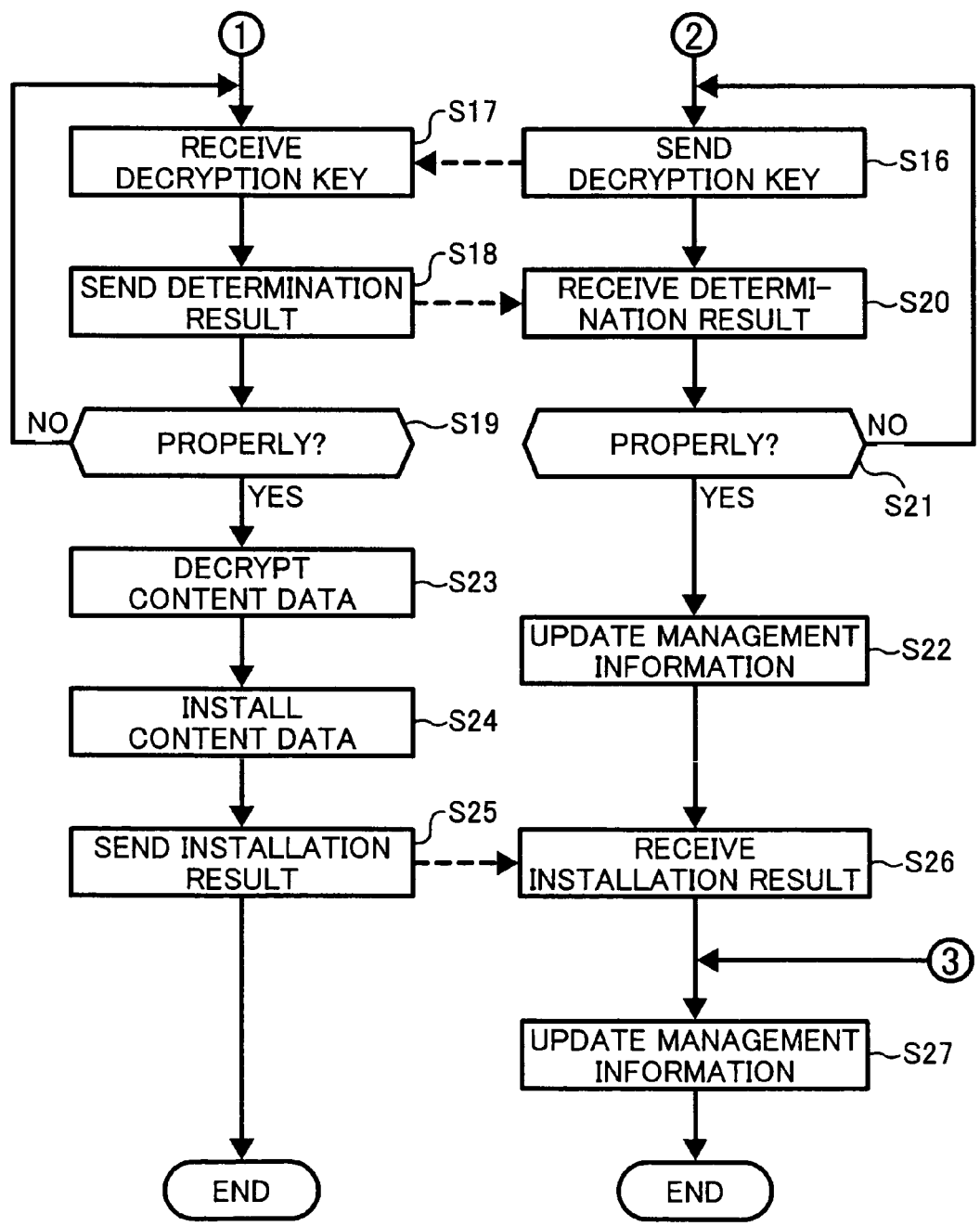
FIG. 6 is a flowchart (continuation) for explaining the processes performed by the decryption key managing server apparatus and the user terminal.

Next, the processes to be performed by the user terminal 300 and decryption key managing server apparatus 500 will be explained with reference to FIG. 2, FIG. 4 and the flowchart of FIG. 5. Here, a case that the user terminal 300 decrypts the content data recorded on the recording medium 4 and installs it thereon will be explained. The user terminal 300 and the decryption key managing server apparatus 500 perform the processes to be explained below, each time the content data recorded on the recording medium 4 is installed or reproduced.

First, the control unit 370 of the user terminal 300 controls the reading device 320 to read out product information of the product 200 from the recording medium 4 (step S1). The product information includes the product ID of the product 200 indicating its product type. The control unit 370 reads out the communication program from the recording medium 4 and activates it (step S2). This communication program is a program for connecting the user terminal 300 to the decryption key managing server apparatus 500 to enable data exchange between them. The user inputs the license number indicated on the paper 5 and user information such as his/her name, phone number, etc. by using the input device, in accordance with an operation screen of the communication program. The control unit 370 acquires the license number and user information input to the input unit 350 (step S3). Then, the control unit 370 controls the communication unit 310 in accordance with the communication program to connect to the decryption key managing server apparatus 500, and sends the product information read out from the recording medium 4 and the acquired license number and user information to the decryption key managing server apparatus 500 (step S4). For example, the communication program includes connection destination information such as a URL (Uniform Resource Locator) of the decryption key managing server apparatus 500, and the control unit 370 establishes communication with the decryption key managing server apparatus 500 in accordance with the connection destination information.

The control unit 510 of the decryption key managing server apparatus 500 controls the communication unit 520 to receive the product information, license number, and user information sent from the user terminal 300 (step S5). The control unit 510 performs a process for identifying whether the obtained product information and license number are the proper ones (step S6). In a case where it is determined that they are not the proper ones, the control unit 510 requires these pieces of information to be sent thereto again, and the control unit 370 of the user terminal 300 receives the user's input again and sends the received information to the decryption key managing server apparatus 500. In a case where the number of times it is determined that the input information pieces are not proper reaches a predetermined retrying number, the control unit 510 sends a notification to the user terminal 300 that the identification fails, and it is desired that the user terminal 300 start from step S1 again. In a case where it is determined that the input information pieces are the proper ones, the control unit 510 stores the received user information in the managing database 501 in association with the obtained license number (step S7).

The control unit 510 of the decryption key managing server apparatus 500 controls the communication unit 520 to send information regarding purchase application for the product 200 corresponding to the received product information to the user terminal 300 (step S8). For example, this information includes convention on the usage of the content data, a license period, etc. The control unit 370 of the user terminal 300 controls the communication unit 310 to receive the application information from the decryption key managing server apparatus 500 (step S9). The application information is displayed on the monitor 331 under the control of the control unit 370.

The control unit 370 controls the input unit 350 and receives an input of information (hereinafter referred to as "consent information") from the user regarding whether or not the user consents to the application information (step S10). The input unit 350 outputs the input consent information to the control unit 370. In a case where no consent information is input (step S11; NO), the control unit 370 repeats step S10. In a case where consent information is input (step S11; YES), the control unit 370 controls the communication unit 310 to send the consent information to the decryption key managing server apparatus 500 (step S12). The control unit 510 of the decryption key managing server apparatus 500 controls the communication unit 520 to receive the consent information (step S13).

The control unit 510 of the decryption key managing server apparatus 500 determines whether or not the user of the user terminal 300 consents to the application information of the product 200 based on the received consent information (step S14). In a case where it is determined that the user does not consent (step S14; NO), the control unit 510 records the user's intention not of consent, in the managing database 501 (step S27), and terminates the process. To the contrary, in a case where it is determined that the user consents (step S14; YES), the control unit 510 extracts the decryption key corresponding to the license number from the managing database 501 (step S15). At this time, the control unit 510 may record the date on which the decryption key is extracted in the managing database 501.

In a case where it is determined at step S14 that the user does not consent, the control unit 510 may send a decryption key for limiting those that can be used in the content data. That is, the control unit 510 may send a decryption key for trial use of the content data.

The control unit 510 of the decryption key managing server apparatus 500 controls the communication unit 520 to send the extracted decryption key to the user terminal 300 (step S16). The control unit 370 of the user terminal 300 controls the communication unit 310 to receive the decryption key from the decryption key managing server apparatus 500 (step S17).

The control unit 370 determines whether or not it has received the decryption key properly, and controls the communication unit 310 to send the determination result to the decryption key managing server apparatus 500 (step S18). In a case where it is determined that the decryption key has not been received properly (step S19; NO), the control unit 370 returns to step S17. In a case where it is determined that the decryption key has been received properly (step S19; YES), the control unit 370 goes to step S23 described later.

For example, the decryption key is sent from the decryption key managing server apparatus 500 together with a CRC (Cyclic Redundancy Check) code generated by the control unit 510. The same CRC code is generated from the same decryption key without fail. A completely different CRC code is generated with only 1-byte change in the source data. The control unit 370 of the user terminal 300 compares the CRC code received from the decryption key managing server apparatus 500 with a CRC code which the control unit 370 generates from the decryption key received at the same time, to determine whether the decryption key has been received properly or not.

On the other hand, the control unit 510 of the decryption key managing server apparatus 500 controls the communication unit 520 to receive the determination result (step S20). The control unit 510 determines whether or not the user terminal 300 has received the decryption key properly. In a case where it is determined that the user terminal 300 has not received the decryption key properly (step S21; NO), the control unit 510 returns to step S16. In a case where it is determined that the user terminal 300 has received the decryption key properly (step S21; YES), the control unit 510 updates the management information stored in the managing database 501 (step S22). Specifically, the control unit 510 stores the user information, the registration date (the date on which this process is done), and the consent information in association with the license number.

The managing database 501 may store a plurality of registration dates, plural pieces of consent information, etc. in association with one license number. That is, in a case where one content data is downloaded (or reproduced) plural times, the dates of downloading or (reproducing) may be logged.

Next, if the control unit 370 of the user terminal 300 receives the decryption key properly (step S19; YES), the control unit 370 reads out the encrypted content data from the recording medium 4, and decrypts the data with the received decryption key (step S23). Then, the control unit 370 installs the decrypted content data in the storage unit 360 (step S24). In a case where the content data is data of videos and music, the control unit 370 starts reproducing the data. Then, the control unit 370 determines whether or not it has succeeded in installing the decrypted content data, and controls the communication unit 310 to send the installation result to the decryption key managing server apparatus 500 (step S25). The control unit 510 of the decryption key managing server apparatus 500 controls the communication unit 520 to receive the installation result (step-S26). Then, the control unit 510 stores the installation result and the total number of installations in the managing database 501 (step S27).

In a case where it is determined that the installation of the content data ends in failure, the control unit 370 may return to step S17 to start again from receiving the decryption key. In this case, the control unit 510 of the decryption key managing server apparatus 500 may also return to step S16 to again send the decryption key.

Alternatively, in the case where it is determined that the installation of the content data ends in failure, the control unit 370 may return to step S23 to retry decryption, or may return to step S24 to retry installing.

As described above, according to the present embodiment, the user terminal 300 needs to acquire the decryption key and decrypt the data each time the content data recorded on the recording medium 4 is installed or reproduced. Therefore, it is possible to prohibit installing and reproducing without authorization. Further, being provided with the user information, etc. stored in the managing database 501, the seller 100 can effectively distribute update information on the product 200 or advertisements for related products. It is desired that such information be provided to those users who recorded an intention of consent as the consent information.

In the above-described process, since all that the user has to do is to input the license number and user information, the present information managing system does not put a heavy load on the user. Since the decryption key managing server apparatus 500 stores the decryption key in association with the product information and the license number and supplies only such a decryption key as corresponding to the license number sent from the user terminal 300, the seller 100 can safely and easily perform the license management.

The present invention is not limited to the above-described embodiment, but can be modified and applied in various manners. Further, only a part of the principle of the above-described embodiment may be employed or a different embodiment may be employed by combining arbitrary parts of the principle.

As an advanced example, the information managing system may impose a limit on the number of times the content data recorded on the recording medium 4 can be installed or reproduced, by using the information stored in the managing database 501. In this case, the control unit 510 of the decryption key managing server apparatus 500 stores information indicating that the decryption key has been sent to the user terminal 300 in the managing database 501 in association with the license number, at the timing at which the decryption key is sent to the user terminal 300 at step S16. Or, it may be at the timing at which the management information is updated at step S22 or step S27. Then, at step S6, the control unit 510 identifies whether the product information and the license number are the proper ones or not, and also determines whether or not the number of times the installation has been done using the recording medium 4 corresponding to that license number has reached a predetermined limit number. In a case where the number of installation times has not yet reached the predetermined limit number, the control unit 510 sends the application information as so in the above-described flowchart (step S8). To the contrary, in a case where the number of installation times has reached the predetermined limit number, the control unit 510 sends a notification that installation or reproduction is not allowed and terminates the process, instead of sending the application information. Alternatively, the control unit 510 may send a notification that the user needs to newly purchase the product 200.

As another advanced example, the information managing system may put a limit on the period in which the content data recorded on the recording medium 4 can be installed or reproduced, by using the information stored in the managing database 501. In this case, information indicating the period for which the license is in force is stored in the managing database 501 in association with the product ID or the license number. At step S6, the control unit 510 of the decryption key managing server apparatus 500 identifies whether or not the product information and the license number are the proper ones, and also determines whether or not the current date is within the period for which the license is in force. In a case where it is within the period, the control unit 510 sends the application information as shown in the flowchart described above (step S8). To the contrary, in a case where the current date is not within the period, the control unit 510 sends a notification that installation or reproduction is not allowed and terminates the process, instead of sending the application information. Or, it may send a notification that the user needs to newly purchase the product 200.

Such limitation of the times or the period is suitable for providing rental DVDs and CDs. Limitations may also be imposed on the number of times or period the content data can be copied, not only on the number of time or period allowed for installation and reproduction of the content data.

The content data may be provided without using the recording medium 4, but through distribution via a communication network. For example, the license number can be notified to the user by an e-mail indicating the license number, instead of using the paper 5.

As another advanced example, the information managing system may update the content data by using the information stored in the managing database 501. In this case, the managing database 501 stores update information in association with the product ID or the license number. The update information includes information indicating whether the content data has some data to be corrected or updated, and further includes information indicating the storage location of the update data if the content data-requires correcting or updating. The control unit 370 of the user terminal 300 sends the product information and also version information of the content data at step S4. The control unit 510 of the decryption key managing server apparatus 500 determines whether or not there is update data, based on the received version information. In a case where there is no update data, the control unit 510 sends the application information as shown in the above-described flowchart (step S8). To the contrary, in a case where there is update data, the control unit 510 sends the application information and a notification encouraging updating. The control unit 370 of the user terminal 300 receives an instruction input regarding whether or not the user consents to updating (step S10), and sends consent information (step S12). The control unit 510 of the decryption key managing server apparatus 500 receives the consent information (step S13), updates the management information (step S27) if the user does not consent, and terminates the process. To the contrary, in a case where the user consents, the control unit 510 extracts the decryption key (step S15), and acquires the update data. Then, the control unit 510 sends the decryption key and the update data at step S16. The control unit 370 of the user terminal 300 installs and updates the content data at step S24.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2005-224224 filed on Aug. 2, 2005 and including specification, claims, drawings and summary. The disclosure of the above Japanese Patent Application is incorporated herein by reference in its entirety.

What is claimed is:

1. An information managing method used for a system for prohibiting electronically treatable content data from being copied, installed, or reproduced without authorization, said content data being encrypted beforehand, and an identification code being assigned to each content data, said method being implemented by a server apparatus storing a decryption key for decrypting said encrypted content data, and an information processing terminal connected to said server apparatus via a communication network for copying, installing, or reproducing said content data, said server apparatus comprising a storage unit for storing, in association with said identification code, a predetermined number of times said decryption key can be sent to said information processing terminal, a predetermined period during which said decryption key can be sent to said information processing terminal, and result data indicating a result of copying, installing, or reproducing said content data by said information processing terminal, said method comprising:

an identification code sending step of said information processing terminal receiving from a user an input of an identification code corresponding to said content data to be reproduced and sending said identification code thus received to said server apparatus, in a case where said information processing terminal is to copy, install, or reproduce said content data;

an identification code receiving step of said server apparatus receiving said identification code from said information processing terminal;

an application information sending step of said server apparatus sending application information on purchase application of content data corresponding to said received identification code to said information processing terminal;

an application information receiving step of said information processing terminal receiving said application information from said server apparatus;

a consent information sending step of said information processing terminal receiving an input of information from said user regarding whether said user consents to said received application information, and sending consent information indicating said input information to said server apparatus;

a consent information receiving step of said server apparatus receiving said consent information;

a determining step of said server apparatus determining whether said user consents to said application information based on said received consent information;

a decryption key sending step of, upon determination that said user consents to said application information at said determining step, said server apparatus sending said decryption key that corresponds to said content data indicated by said received identification code to said information processing terminal;

a decryption key receiving step of said information processing terminal receiving said decryption key from said server apparatus;

a decrypting step of said information processing terminal decrypting said encrypted content data by using said received decryption key;

a result sending step of said information processing terminal sending said server apparatus a result indicating whether copying, installing, or reproducing of said content data has succeeded;

a result receiving step of said server apparatus receiving said result from said information processing terminal; and an updating step of said server apparatus updating said result data stored in said storage unit based on said received result, wherein upon reception of said result indicating that copying, installing, or reproducing of said content data has not succeeded in said result receiving step, said server apparatus resends said decryption key to said information processing terminal in said decryption key sending step, and said information processing terminal again receives said decryption key from said server apparatus in said decryption key receiving step.

2. The information managing method according to claim 1, wherein: at said determining step, said server apparatus determines whether a number of times said decryption key corresponding to said identification code received at said identification code receiving step has been sent at said decryption key sending step is smaller than or equal to the predetermined number of times or whether a period during which said decryption key corresponding to said identification code received at said identification code receiving step has been sent at said decryption key sending step is shorter than or equal to the predetermined period; and at said decryption key sending step, said decryption key corresponding to said identification code received at said identification code receiving step is sent to said information processing terminal, upon determination at said determining step that the number of times said decryption key has been sent at said decryption key sending step is smaller than or equal to the predetermined number of times or that a period during which said decryption key has been sent at said decryption key sending step is shorter than or equal to the predetermined period.

3. The information managing method according to claim 1, wherein: said content data is recorded on a recording medium and distributed in a recorded form; and said recording medium stores a communication program for accessing said server apparatus, and said identification code is assigned to each content data.

4. The information managing method according to claim 1, wherein: said content data is distributed in a form of an electronic file sendable and receivable on said communication network; and a communication program for accessing said server apparatus is attached to said electronic file, and said identification code is assigned to each content data.

5. The information managing method according to claim 1, wherein, upon determination that said user does not consent to said application information at said determining step, said server apparatus sends said information processing terminal said decryption key that corresponds to said content data indicated by said received identification code, said decryption key being used for decrypting said content data wherein functions that can be used by said user are limited, at said decryption key sending step.

6. An information managing system for prohibiting electronically treatable content data from being copied, installed, or reproduced without authorization;

said content data being encrypted beforehand, and an identification code being assigned to each content data, said system comprising: a server apparatus storing a decryption key for decrypting said encrypted content data; and an information processing terminal connected to said server apparatus via a communication network for copying, installing, or reproducing said content data, wherein said information processing terminal comprises:
an identification code sending unit which receives from a user an input of an identification code corresponding to said content data to be reproduced and sends said identification code thus received to said server apparatus, in a case where said information processing terminal is to copy, install, or reproduce said content data;

an application information reception unit which receives application information on purchase application of content data corresponding to said received identification code from said server apparatus;

a consent information sending unit which receives an input of information from said user regarding whether said user consents to said received application information, and sends consent information indicating said input information to said server apparatus;

a decryption key reception unit which receives said decryption key that corresponds to said content data indicated by said identification code;

a decryption unit which decrypts said encrypted content data by using said received decryption key; and a result sending unit which sends said server apparatus a result indicating whether copying, installing, or reproducing of said content data has succeeded, and said server apparatus comprises:
a storage unit for storing, in association with said identification code, a predetermined number of times said decryption key can be sent to said information processing terminal, a predetermined period during which said decryption key can be sent to said information processing terminal, and result data indicating a result of copying, installing, or reproducing said content data by said information processing terminal;

an identification code reception unit which receives said identification code from said information processing terminal;

an application information sending unit which sends said application information to said information processing terminal;

a consent information reception unit which receives said consent information from said information processing terminal;

a determination unit which determines whether said user consents to said application information based on said received consent information;

a decryption key sending unit which, upon determination that said user consents to said application information by said determination unit, sends said decryption key that corresponds to said content data indicated by said received identification code to said information processing terminal;

a result receiving unit which receives from said information processing terminal, said result indicating whether copying, installing, or reproducing of said content data has succeeded; and an updating unit which updates said result data stored in said storage unit based on said received result, wherein upon reception, by said result receiving unit, of said result indicating that copying, installing, or reproducing of said content data has not succeeded, said decryption key sending unit resends said decryption key to said information processing terminal, and said decryption key reception unit again receives said decryption key from said server apparatus.

7. The information managing system according to claim 6, wherein said determination unit determines whether a number of times said decryption key sending unit has sent said decryption key corresponding to said identification code received by said identification code reception unit is smaller than or equal to the predetermined number of times or whether a period during which said decryption key sending unit has sent said decryption key corresponding to said identification code received by said identification code reception unit is shorter than or equal to the predetermined period; and said decryption key sending unit sends said decryption key that corresponds to said identification code received by said identification code reception unit to said information processing terminal, upon determination by said determination unit that the number of times said decryption key sending unit has sent said decryption key is smaller than or equal to the predetermined number of times or that a period during which said decryption key sending unit has sent said decryption key is shorter than or equal to the predetermined period.

8. The information managing system according to claim 6, wherein: said content data is recorded on a recording medium and distributed in a recorded form; and said recording medium stores a communication program for accessing said server apparatus, and said identification code is assigned to each content data.

9. The information managing system according to claim 6, wherein: said content data is distributed in a form of an electronic file sendable and receivable on said communication network; and communication software for accessing said server apparatus is attached to said electronic file, and said identification code is assigned to each content data.

10. A server apparatus used in a system for prohibiting electronically treatable content data from being copied, installed, or reproduced without authorization, said content data being encrypted beforehand, and an identification code being assigned to each content data, said server apparatus being connected, via a communication network, to an information processing terminal for copying, installing, or reproducing said content data, and comprising:

a storage unit for storing, in association with said identification code, a predetermined number of times a decryption key for decrypting said encrypted content data can be sent to said information processing terminal, a predetermined period during which said decryption key can be sent to said information processing terminal, and result data indicating a result of copying, installing, or reproducing said content data by said information processing terminal;

an identification code sending reception unit which receives from a user an input of an identification code corresponding to said content data to be reproduced and receives said identification code received from said information processing terminal, in a case where said information processing terminal is to copy, install, or reproduce said content data;

an application information sending unit which sends application information on purchase application of content data corresponding to said received identification code to said information processing terminal;

a consent information reception unit which receives consent information on whether said user consents to said application information from said information processing terminal;

a determination unit which determines whether said user consents to said application information based on said received consent information;

a decryption key sending unit which, upon determination that said user consents to said application information by said determination unit, sends said decryption key which corresponds to said content data indicated by said received identification code to said information processing terminal;

a result receiving unit which receives, from said information processing terminal, said result indicating whether copying, installing, or reproducing of said content data has succeeded; and an updating unit which updates said result data stored in said storage unit based on said received result, wherein upon reception, by said result receiving unit, of said result indicating that copying, installing, or reproducing of said content data has not succeeded, said decryption key sending unit resends said decryption key to said information processing terminal.

11. The server apparatus according to claim 10, wherein:

said determination unit determines whether a number of times said decryption key sending unit has sent said decryption key corresponding to said identification code received by said identification code reception unit is smaller than or equal to the predetermined number of times or whether a period during which said decryption key sending unit has sent said decryption key corresponding to said identification code received by said identification code reception unit is shorter than or equal to the predetermined period; and said decryption key sending unit sends said decryption key that corresponds to said identification code received by said identification code reception unit to said information processing terminal, upon determination by said determination unit that the number of times said decryption key sending unit has sent said decryption key is smaller that or equal to the predetermined number of times or that a period during which said decryption key has been sent by said decryption key sending unit is shorter than or equal to the predetermined period.

12. An information managing system for prohibiting electronically treatable content data from being copied, installed, or reproduced without authorization;

said content data being encrypted beforehand, and an identification code being assigned to each content data, said system comprising: a server apparatus storing a decryption key for decrypting said encrypted content data; and an information processing terminal connected to said server apparatus via a communication network for copying, installing, or reproducing said content data, wherein said information processing terminal comprises:

an identification code sender configured to receive from a user an input of an identification code corresponding to said content data to be reproduced and send said identification code thus received to said server apparatus, in a case where said information processing terminal is to copy, install, or reproduce said content data;

application information reception means which receives application information on purchase application of content data corresponding to said received identification code from said server apparatus;

consent information sending means which receives an input of information from said user regarding whether said user consents to said received application information, and sends consent information indicating said input information to said server apparatus;

decryption key reception means for receiving said decryption key that corresponds to said content data indicated by said identification code;

decryption means which decrypts said encrypted content data by using said received decryption key; and result sending means which sends said server apparatus a result indicating whether copying, installing, or reproducing of said content data has succeeded, and said server apparatus comprises:

storage means for storing, in association with said identification code, a predetermined number of times said decryption key can be sent to said information processing terminal, a predetermined period during which said decryption key can be sent to said information processing terminal, and result data indicating a result of copying, installing, or reproducing said content data by said information processing terminal;

an identification code receiver configured to receive said identification code from said information processing terminal;

application information sending means which sends said application information to said information processing terminal;

consent information reception means which receives said consent information from said information processing terminal;

determination means which determines whether said user consents to said application information based on said received consent information;

decryption key sending means which, upon determination that said user consents to said application information by said determining means, sends said decryption key that corresponds to said content data indicated by said received identification code to said information processing terminal;

result receiving means which receives, from said information processing terminal, said result indicating whether copying, installing, or reproducing of said content data has succeeded; and updating means which updates said result data stored in said storage means based on received result, wherein upon reception, by said result receiving means, of said result indicating that copying, installing, or reproducing of said content data has not succeeded, said decryption key sending means resends said decryption key to said information processing terminal, and said decryption key reception means again receives said decryption key from said server apparatus.

13. A server apparatus used in a system for prohibiting electronically treatable content data from being copied, installed, or reproduced without authorization, said content data being encrypted beforehand, and an identification code being assigned to each content data, said server apparatus being connected, via a communication network, to an information processing terminal for copying, installing, or reproducing said content data, and comprising:

storage means for storing, in association with said identification code, a predetermined number of times said decryption key can be sent to said information processing terminal, a predetermined period during which said decryption key can be sent to said information processing terminal, and result data indicating a result of copying, installing, or reproducing said content data by said information processing terminal;

an identification code receiver configured to receive from a user an input of an identification code corresponding to said content data to be reproduced and receives said identification code received from said information processing terminal, in a case where said information processing terminal is to copy, install, or reproduce said content data;

application information sending means which sends application information on purchase application of content data corresponding to said received identification code to said information processing terminal;

consent information reception means which receives consent information on whether said user consents to said application information from said information processing terminal;

determination means which determines whether said user consents to said application information based on said received consent information;

decryption key sending means which, upon determination that said user consents to said application information by said determination means, sends a decryption key which corresponds to said content data indicated by said received identification code to said information processing terminal;

result receiving means which receives, from said information processing terminal, said result indicating whether copying, installing, or reproducing of said content data has succeeded; and updating means which updates said result data stored in said storage means based on said received result, wherein upon reception, by said result receiving means, of said result indicating that copying, installing, or reproducing of said content data has not succeeded, said decryption key sending means resends said decryption key to said information processing terminal.

* * * * *